United States Patent
Ishihara et al.

(10) Patent No.: US 6,706,818 B2
(45) Date of Patent: Mar. 16, 2004

(54) CURABLE RESIN COMPOSITION

(75) Inventors: Yushichi Ishihara, Yokohama (JP);
Masami Sugishima, Hiratsuka (JP);
Nobushige Numa, Ebina (JP);
Mitsutaka Hasegawa, Nogoya (JP);
Hiroshi Inukai, Nagoya (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 10/156,793

(22) Filed: May 30, 2002

(65) Prior Publication Data
US 2003/0125471 A1 Jul. 3, 2003

(30) Foreign Application Priority Data

Sep. 26, 2001 (JP) ........................................ 2001-293594

(51) Int. Cl.$^7$ ................................................. C08G 18/62
(52) U.S. Cl. .................... 525/194; 525/205; 525/326.8; 525/327.6; 524/850; 524/859
(58) Field of Search ................................. 525/194, 205, 525/326.8, 327.6; 524/850, 859

(56) References Cited

U.S. PATENT DOCUMENTS 6,117,936 A 9/2000 Kato et al.

FOREIGN PATENT DOCUMENTS

| EP | 0 545 081 A1 | 6/1993 |
|---|---|---|
| JP | 52-22878 | 6/1977 |
| JP | 56-053119 | 5/1981 |
| JP | 01-242569 | 9/1989 |
| JP | 08-151358 | 6/1996 |
| JP | 08-245878 | 9/1996 |
| JP | 08-283377 | 10/1996 |
| JP | 10-259356 | 9/1998 |
| JP | 11-50002 | 2/1999 |

OTHER PUBLICATIONS

Patent Abstracts of Japan, vol. 018, No. 182 (C–1184), Mar. 29, 1994 (abstract of JP 05 339542 A (Kansai Paint Co Ltd), Dec. 21, 1993).
Database WPI Week 9402 Derwent Publications Ltd., London, GB; AN 1994–012366 XP002227552 (abstract of JP 05 320299 A (Mitsubishi Yuka Badische), Dec. 3, 1993).
Patent Abstracts of Japan, vol. 013, No. 021 (C–560), Jan. 18, 1989 (abstract of JP 63 227508 A (Kanebo Ltd), Sep. 21, 1988).

*Primary Examiner*—Rachel Gorr
(74) *Attorney, Agent, or Firm*—Wenderoth, Lind & Ponack, L.L.P.

(57) ABSTRACT

This invention provides a curable resin composition for one-pack type water-based paint which is readily cured regardless of coating environment, said resin composition comprising copolymer (I) which is produced by the copolymerization of unsaturated group-containing urethane prepolymer (A) which is obtained from a reaction of diisocyanate compound (a), glycol compound (b), carboxyl group-containing glycol compound (c) and hydroxyl group-containing ethylenically unsaturated monomer (d), with maleimide group-containing ethylenically unsaturated monomer (e), carbonyl group-containing ethylenically unsaturated monomer (f) and another ethylenically unsaturated monomer (g), and compound (II) which has, per molecule, two or more same or different functional groups selected from hydrazide group, semicarbazide group and hydrazone group

33 Claims, No Drawings

CURABLE RESIN COMPOSITION

This invention relates to a curable resin composition, in more detail, to a resin composition for one-pack type water-based paint which is readily cured regardless of coating environment.

Aqueous dispersion of acrylic copolymer has mainly been used as water-based cold-dryable one-pack type paint for the interior and exterior decoration of building. A coating film formed from paint which contains aqueous dispersion of acrylic copolymer is excellent in weatherability and hardness, but is poor in water resistance and stain resistance. On the other hand, there has been an increasing market demand for paint which gives good film elasticity and toughness, and, thus, it is under consideration to employ urethane resin for water-based paint. As an example of water-based paint which has urethane function, Japanese Patent Application Laid-Open No. 259356/1998 and Japanese Patent Application Laid-Open No. 50002/1999 have each disclosed a resin composition for water-based paint which contains aqueous carbonyl group-containing polyurethane resin and hydrazide compound. Said composition has no problem in coating workability, and gives a coating film which is excellent in water-resistance, weatherability and low-temperature physical properties. This resin composition has, however, a defect that crosslinking reaction does not proceed sufficiently depending on coating environment. For instance, in the case of paint application under such circumstances as low temperature where moisture evaporation is markedly slow, this composition gives only poor water-resistance (initial water-resistance) at an initial stage after applied.

Inventors of this invention have assiduously studied how to resolve the above-mentioned problems of conventional aqueous urethane resin-containing resin composition for cold-dryable one-pack type water-based paint, and have now found out that a resin composition which comprises both a copolymer of unsaturated group-containing urethane prepolymer, maleimide group-containing ethylenically unsaturated monomer and crosslinkable carbonyl group-containing ethylenically unsaturated monomer, and a hydrazide compound is capable of forming a coating film which is excellent in water-resistance and curability even at an initial stage after applied regardless of coating environment, and, thus, this invention has been completed.

This invention provides a curable resin composition which characteristically comprises both copolymer (I) which is produced from the copolymerization of unsaturated group-containing urethane prepolymer (A) which is obtained from a reaction of diisocyanate compound (a), glycol compound (b), carboxyl group-containing glycol compound (c) and hydroxyl group-containing ethylenically unsaturated monomer (d), with maleimide group-containing ethylenically unsaturated monomer (e), carbonyl group-containing ethylenically unsaturated monomer (f) and another ethylenically unsaturated monomer (g), and compound (II) which has, per molecule, two or more same or different functional groups selected from hydrazide group, semicarbazide group and hydrazone group.

The following gives a more detailed explanation of the curable resin composition of this invention.

Incidentally, in the present specification, acryloyl group and methacryloyl group are expressed as (meth)acryloyl group; acrylate and methacrylate are expressed as (meth)acrylate; acrylic acid and methacrylic acid are expressed as (meth)acrylic acid; acrolein and methacrolein are expressed as (meth)acrolein; acrylamide and methacrylamide are expressed as (meth)acrylamide; and allyl group and methallyl group are expressed as (meth)allyl group.

Copolymer (I)

Copolymer (I) which is used for the curable resin composition of this invention is produced from the copolymerization of unsaturated group-containing urethane prepolymer (A) which is obtained from a reaction of diisocyanate compound (a), glycol compound (b), carboxyl group-containing glycol compound (c) and hydroxyl group-containing ethylenically unsaturated monomer (d), with maleimide group-containing ethylenically unsaturated monomer (e), carbonyl group-containing ethylenically unsaturated monomer (f) and another ethylenically unsaturated monomer (g).

Diisocyanate compound (a) which is used for the production of said unsaturated group-containing urethane prepolymer (A) includes aliphatic, alicyclic and aromatic compounds having two isocyanate groups in a molecule. Concrete examples are 2,4-tolylenediisocyanate, 2,6-tolylenediisocyanate, 4,4'-diphenylmethanediisocyanate, m-phenylenediisocyanate, xylylenediisocyanate, tetramethylenediisocyanate, 2,2,4-trimethylhexanediisocyanate, hexamethylenediisocyanate, lysinediisocyanate, 1,4-cyclohexylenediisocyanate, 4,4'-dicyclohexyl-methanediisocyanate, 3,3'-dimethyl-4,4'-biphenylenediisocyanate, 3,3'-dimethoxy-4,4'-biphenylenediisocyanate, 3,3'-dichloro-4,4'-biphenylenediisocyanate, 1,5-naphthalenediisocyanate, 1,5-tetrahydronaphthalenediisocyanate and isophoronediisocyanate, among which aliphatic diisocyanate such as tetramethylenediisocyanate, 2,2,4-trimethylhexanediisocyanate, hexamethylenediisocyanate and lysinediisocyanate, and alicyclic diisocyanate such as 1,4-cyclohexylenediisocyanate, 4,4'-dicyclohexyl-methanediisocyanate and isophoronediisocyanate, are in particular preferable.

Glycol compound (b) includes low molecular weight glycols, high molecular weight glycols, polyesterpolyols and polycarbonatepolyols, which may be used either separately or in combination of two or more kinds.

Examples of said low molecular weight glycols include ethylene glycol, diethylene glycol, triethylene glycol, 1,2-propylene glycol, 1,3-butylene glycol, tetramethylene glycol, hexamethylene glycol, decamethylene glycol, octanediol, tricyclo-decanedimethylol, hydrogenated bisphenol A, cyclohexane-dimethanol and 1,6-hexanediol. Examples of said high molecular weight glycols include polyethylene glycol, polypropylene glycol and polytetramethylene glycol.

The above-mentioned polyesterpolyols include those obtained by a reaction between glycol components and dicarboxylic acid components, which can readily be produced by a conventionally known method such as esterification reaction and transesterification reaction. Said polyesterpolyols also include polyesterdiols which are obtained by ring-opening reaction of cyclic ester compounds such as ε-caprolactone, and copolycondensation polyesters thereof as well.

The above-mentioned carboxyl group-containing glycol compound (c) includes 2,2-dimethylolpropionic acid, 2,2-dimethylolbutyric acid, 2,2-dimethylolvaleric acid and polyester-polyols or polyetherpolyols obtained by the condensation thereof. Said carboxyl group-containing glycol compound (c) may be used in combination with hydroxycarboxylic acid such as 12-hydroxystearic acid, paraoxybenzoic acid and salicylic acid.

Hydroxyl group-containing ethylenically unsaturated monomer (d) is used for introducing an unsaturated group into polyurethane resin skeleton. Examples include (meth) acrylates such as hydroxyethyl (meth)acrylate, hydroxypropyl (meth)acrylate, hydroxybutyl (meth)acrylate, polyethylene glycol mono(meth)acrylate, polyethylene glycol di(meth)acrylate, polypropylene glycol mono(meth) acrylate, ε-caprolactone polyaddition product of hydroxyethyl (meth)acrylate, β-methyl-δ-valerolactone polyaddition product of hydroxyethyl (meth)acrylate, glycerol mono (meth)acrylate and glycerol di(meth)acrylate; allyl compounds such as allyl alcohol, glycerol monoallyl ether and glycerol diallyl ether; and alkylene oxide adducts thereof having 2 to 4 carbon atoms (number of moles of added alkylene oxide is usually 0 to 30, preferably 20 to 30).

For the purpose of the blocking of excess isocyanate groups and the control of the concentration of unsaturated group, a monohydric alcohol may be used, where necessary, in combination with diisocyanate compound (a), glycol compound (b), carboxyl group-containing glycol compound (c) and hydroxyl group-containing ethylenically unsaturated monomer (d), in the synthesis of unsaturated group-containing urethane prepolymer (A).

Although not strictly restrictive, these components (a), (b), (c) and (d) are used in such a proportion that an equivalent ratio of isocyanate groups to hydroxyl groups contained in these components falls in a range of usually 1:1 to 1:1.5, particularly 1:1 to 1:1.3. Among these components, hydroxyl group-containing ethylenically unsaturated monomer (d) is preferably used in a range of usually 0.01 to 1 equivalent, particularly 0.02 to 0.8 equivalent, per equivalent of isocyanate group.

Urethane prepolymer (A) can be produced, for example, from a reaction of diisocyanate compound (a), glycol compound (b), carboxyl group-containing glycol compound (c) and hydroxyl group-containing ethylenically unsaturated monomer (d), either all at once or by a method of multi-stage reaction in which diisocyanate compound (a), a part of glycol compound (b) and carboxyl group-containing glycol compound (c) are first made to react to synthesize a prepolymer at an isocyanate end, the remainder of glycol compound (b) being subsequently made to react with hydroxyl group-containing ethylenically unsaturated monomer (d). The reaction is usually conducted at 40 to 180° C., preferably at 60 to 130° C.

The above-mentioned reaction is desirably carried out in an organic solvent such as dioxane, acetone, methylethylketone, methylisobutylketone, N-methylpyrrolidone, tetrahydrofuran, Texanol isobutylether, which is inert against isocyanate group and which has a strong affinity to water.

Amine-based catalyst such as triethylamine, N-ethylmorpholine and triethylenediamine and tin-based catalyst such as dibutyltin dilaurate and dioctyltin dilaurate may be used for promoting the above-mentioned reaction, as in conventional urethane reaction. Furthermore, polymerization inhibitor such as hydroquinone, hydroquinone monomethyl ether and p-benzoquinone may be used for the prevention of polymerization of ethylenically unsaturated compound during the urethane reaction.

Thus produced unsaturated group-containing urethane prepolymer (A) has preferably an acid value falling in a range of usually 10 to 200 mg KOH/gram of resin solid content, particularly 10 to 150 mg KOH/gram of resin solid content.

The above-mentioned urethane prepolymer (A) is further copolymerized with maleimide group-containing ethylenically unsaturated monomer (e), carbonyl group-containing ethylenically unsaturated monomer (f) and another ethylenically unsaturated monomer (g) to give copolymer (I).

Said maleimide group-containing ethylenically unsaturated monomer (e) is used for introducing into copolymer (I) a maleimide group which, when irradiated with natural light, is to be optically dimerized to thereby cross-link a coating film formed from the resin composition of the present invention. Such maleimide group-containing ethylenically unsaturated monomer (e) includes compound (hereinafter simply referred to as "imide compound") having an ethylenically unsaturated group and a cyclic imide group of the following Formula (1):

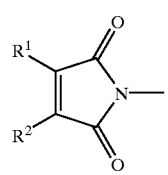

(1)

wherein $R^1$ and $R^2$, taken independently, represent a hydrogen atom or an alkyl group, or, taken together, represent a group forming a carbon ring along with carbon atoms to which they are bonded.

Examples of ethylenically unsaturated group in the above-mentioned imide compound include vinyl group, allyl group and (meth)acryloyl group, among which (meth)acryloyl group is particularly preferred.

From the viewpoint of polymerizability between imide compounds or of copolymerizability with other unsaturated monomers, $R^1$ and $R^2$ in the above Formula (1) are, taken independently, alkyl groups, preferably alkyl groups having at most four carbon atoms, or, taken together, are groups forming a carbon ring, for example —$CH_2CH_2CH_2$— and —$CH_2CH_2CH_2CH_2$—, preferably —$CH_2CH_2CH_2CH_2$—.

Concrete examples of imide compound include imide (meth)acrylate of the following Formula (2):

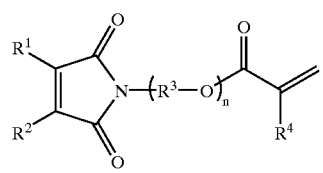

(2)

wherein $R^1$ and $R^2$ mean the same as defined above; $R^3$ represents an alkylene group, preferably an alkylene group having 1 to 6 carbon atoms, more desirably ethylene or propylene group; $R^4$ represents a hydrogen atom or methyl group; and n is an integer of 1 to 6, preferably 1 or 2, more desirably 1.

Compounds of the following Formulas (3) and (4) give examples of the above-mentioned imide (meth)acrylate:

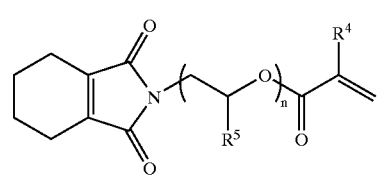

(3)

-continued

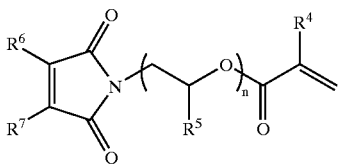

(4)

wherein $R^4$ and $R^5$ represent independently a hydrogen atom or a methyl group; $R^6$ and $R^7$ represent independently an alkyl group having at most four carbon atoms; and n is an integer of 1 to 6.

Imide (meth)acrylate is a conventionally known compound, and can be produced from acid anhydride, aminoalcohol and (meth)acrylic acid by methods described in, for example, Kiyoshi Kato et al., Organic Synthetic Chemistry Association Report, 30 (10), 897, (1972); Javier de Abajo et al., Polymer, vol. 33 (5), 1090, (1992); Japanese Patent Application Laid-Open No. 53119/1981 and Japanese Patent Application Laid-Open No. 242569/1989.

Suited as the above-mentioned carbonyl group-containing ethylenically unsaturated monomer (f) is a monomer having at least one carbonyl group, which is selected from an aldehyde group and a keto group, and a polymerizable double bond in a molecule. Examples thereof include (meth) acrolein, formylstyrol, vinyl alkyl ketone having 4 to 7 carbon atoms (for example, vinyl methyl ketone, vinyl ethyl ketone and vinyl butyl ketone), acetoacetoxyethyl (meth) acrylate and diacetone(meth)acrylamide, among which diacetone (meth)acrylamide is preferred for the reason that it is easily available and excellent in reactivity with compound (III) described later.

Examples of said another ethylenically unsaturated monomer (g) which is to be copolymerized with unsaturated group-containing urethane prepolymer (A), maleimide group-containing ethylenically unsaturated monomer (e) and carbonyl group-containing ethylenically unsaturated monomer (f) as described above include alkyl (meth) acrylates such as methyl (meth)acrylate, ethyl (meth) acrylate, propyl (meth)acrylate, n-butyl (meth)acrylate, isobutyl (meth)acrylate, pentyl (meth)acrylate, hexyl (meth) acrylate, 2-ethylhexyl (meth)acrylate, lauryl(meth) acrylate and stearyl (meth)acrylate; alicyclic (meth)acrylate such as cyclohexyl (meth)acrylate and isobornyl (meth)acrylate; aralkyl (meth)acrylate such as benzyl (meth)acrylate; alkoxyalkyl (meth)acrylate such as 2-methoxyethyl (meth) acrylate and 2-ethoxyethyl (meth)acrylate; hydroxyalkyl (meth)acrylate such as hydroxyethyl (meth)acrylate, hydroxypropyl (meth)acrylate and hydroxybutyl (meth) acrylate; perfluoroalkyl (meth)acrylate, glycidyl (meth) acrylate, N,N-diethylaminoethyl (meth)acrylate, (meth) acrylic acid, (meth)acrylamide and (meth)acrylonitrile; vinyl ester compound such as vinyl acetate and vinyl propionate; aromatic vinyl compound such as styrene and α-methylstyrene; and ethylenically unsaturated monomer having an alkoxysilyl group such as vinyl trimethoxy-silane, vinyl triethoxysilane, γ-methacryloyloxypropyl trimethoxysilane and γ-methacryloyloxypropyl triethoxysilane, among which styrene, alkyl (meth)acrylate having an alkyl group having 1 to 8 carbon atoms, (meth)acrylic acid, and hydroxyalkyl (meth)acrylate having an alkylene group having 2 to 4 carbon atoms and acrylamide are preferred from the viewpoint of copolymerizability, coating film physical properties and particle stability.

Copolymer (I) can readily be produced, for example, by the copolymerization of the above-mentioned unsaturated group-containing urethane prepolymer (A) with maleimide group-containing ethylenically unsaturated monomer (e), carbonyl group-containing ethylenically unsaturated monomer (f) and another ethylenically unsaturated monomer (g) as described above in the presence of water and a surfactant as emulsifier according to any usual emulsion polymerization method.

In the emulsion polymerization described above, said components of unsaturated group-containing urethane prepolymer (A), maleimide group-containing ethylenically unsaturated monomer (e), carbonyl group-containing ethylenically unsaturated monomer (i) and another ethylenically unsaturated monomer (g) can generally be used in such a proportion that the amount of unsaturated group-containing urethane prepolymer (A) falls in a range of 2 to 40% by weight, preferably 4 to 35% by weight; the amount of monomer (e) falls in a range of 1 to 30% by weight, preferably 4 to 20% by weight; the monomer (f) falls in a range of 1 to 30% by weight, preferably 2 to 25% by weight; and the amount of monomer (g) falls in a range of 0 to 96% by weight, preferably 20 to 90% by weight, each based on the total amount of the components (A), (e), (i) and (g).

If the proportion of unsaturated group-containing urethane prepolymer (A) used is less than 2% by weight, coating film properties at a low temperature decrease while, if it exceeds 40% by weight, thus obtained coating film may receive adverse effects with respect to physical properties such as weatherability. If the proportion of maleimide group-containing ethylenically unsaturated monomer (e) is less than 1% by weight, crosslinking which is caused by optical curing may become insufficient with the result that thus obtained coating film may have poor water resistance under circumstances where moisture vaporization is slow. When, on the other hand, said proportion exceeds 30% by weight, crosslinking density becomes too high with the result that the coating film may become fragile. If the proportion of carbonyl group-containing ethylenically unsaturated monomer (I) as described above is less than 1% by weight, the hardness, water resistance and stain resistance of coating film tend to decrease, while, when said proportion exceeds 30% by weight, the storage stability of coating film is apt to be reduced.

As emulsifier, anionic surfactant is preferable. In particular suitable is a surfactant having a polyoxyalkylene group (wherein the recurrence number of oxyalkylene unit is 300 or less, in particular 5 to 50, and wherein alkylene group is ethylene group or propylene group) as a principal chain and having a hydrophobic group at one end and an ion-dissociative group at the other end. Examples of said hydrophobic group include alkyl group and aryl group. Said ion-dissociative group is preferably a salt wherein oxyalkylene group is covalently bonded to anion, to which, in turn, cation is ionically bonded. Concrete examples of such an ion-dissociative group include —$SO_3$, Na, —$SO_3NH_4$, —COONa, —$COONH_4$, —$PO_3Na_2$ and —$PO_3(NH_4)_2$. Commercial products of such surfactant include, for example, "Newcol 560SN", "Newcol 560SF", "Newcol 707SF", "Newcol 861SE" and "Newcol 1305SN" (all of which are manufactured by Nippon Nyukazai Co., Ltd.); "Hitenol" series, (manufactured by Dai-ichi Kogyo Seiyaku Co., Ltd.); and "Emal NC-35" and "Levenol WZ" (both of which are manufactured by Kao Corporation). These surfactants may each be used in an amount of 0.1 to 6% by weight, preferably 0.2 to 5% by weight, based on the total amount of the monomers used.

When such a surfactant is used as emulsifier, a hydrophilic polyoxyalkylene chain part coordinates between the polymer phase of thus formed copolymer particle and an anion in water, and successfully prevents the acceleration of cross-linking on the surface of particle of emulsified copolymer during the storage thereof. In the present invention, the above-mentioned unsaturated group-containing urethane prepolymer (A) has emulsifying ability, and, on this account, the above-mentioned usual amount of emulsifier (surfactant) may be reduced.

Emulsion-polymerization of unsaturated group-containing urethane prepolymer (A) with maleimide group-containing ethylenically unsaturated monomer (e), carbonyl group-containing ethylenically unsaturated monomer (f) and another ethylenically unsaturated monomer (g) are carried out as follows. For instance, the above-mentioned component (A) is neutralized, and, then, a mixture of components (e), (f) and (g) is added thereto to give aqueous emulsion, with use of the above-mentioned surfactant. This aqueous emulsion is added to an aqueous medium which contains polymerization initiator, with heating and stirring, and, in this manner, emulsion polymerization is conducted.

As neutralizing agent which is used for the neutralization of urethane prepolymer (A), any can be employed without restriction so long as it can neutralize a carboxyl group. Examples include sodium hydroxide, potassium hydroxide, trimethylamine, dimethylaminoethanol, 2-methyl-2-aminopropanol, triethylamine and ammonia. Neutralizing agent may previously be added to urethane prepolymer (A) to neutralize carboxyl group. Or, otherwise, neutralizing agent may be added in advance to water as dispersion medium, so that neutralization may occur simultaneously with dispersion. The amount of neutralizing agent used is usually 0.5 to 2.0 equivalents, preferably 0.7 to 1.3 equivalents, per equivalent of carboxyl group.

As the polymerization initiator, there may be employed azo type initiator such as azoisovaleronitrile; persulfates such as ammonium persulfate and potassium persulfate; and peroxides such as t-butyl hydroperoxide. Furthermore, a reducing agent such as sodium formaldehyde sulfoxylate can also be used, for the purpose of lowering polymerization temperature.

In this invention, copolymer (I) is preferably produced by multi-stage emulsion polymerization of the above-mentioned unsaturated group-containing urethane prepolymer (A) with maleimide group-containing ethylenically unsaturated monomer (e), carbonyl group-containing ethylenically unsaturated monomer (f) and another ethylenically unsaturated monomer (g) in the presence of water and emulsifying agent. In an example of multi-stage emulsion polymerization, a mixture of unsaturated monomers which forms inner-layer component is subjected to the fist-stage emulsion polymerization with use of polymerization initiator in the presence of an emulsifier to give a polymeric aqueous dispersion. Thereafter, in said aqueous dispersion, a mixture of unsaturated monomers which forms outer-layer component and unsaturated group-containing urethane prepolymer (A) are subjected to the second-stage and subsequent emulsion polymerization in succession in a similar manner, with use of emulsifier and polymerization initiator. In this way, there is obtained a particulate aqueous dispersion of emulsion polymer which has multi-layer structure.

In at least one stage of polymerization in the multi-stage emulsion polymerization process, there are essentially used maleimide group-containing ethylenically unsaturated monomer (e) and carbonyl group-containing ethylenically unsaturated monomer (f) which are crosslinking components. On the basis of the total amount of monomers (e), (f) and (g) which are used in the multi-stage process, maleimide group-containing ethylenically unsaturated monomer (e) is used in an amount of 1 to 40% by weight, preferably 4 to 35% by weight, and carbonyl group-containing ethylenically unsaturated monomer (f) is used in an amount of 1 to 30% by weight, preferably 4 to 35% by weight. In particular, in the last stage of polymerization, maleimide group-containing ethylenically unsaturated monomer (e) is used in an amount of 5 to 40% by weight, preferably 10 to 35% by weight, and carbonyl group-containing ethylenically unsaturated monomer (f) is used in an amount of 5 to 30% by weight, preferably 10 to 25% by weight, on the basis of the total amount of monomers (e), (f) and (g) which are used in said last stage.

Unsaturated group-containing urethane prepolymer (A) may be used at any stage of emulsion polymerization in the multi-stage process. In view of particle stability etc. and of sufficient urethane effect such as low-temperature physical properties, however, unsaturated group-containing urethane prepolymer (A) is preferably used at the last stage of emulsion polymerization. In emulsion polymerization at the stage where said unsaturated group-containing urethane prepolymer (A) is used, unsaturated monomeric components are preferably contained in an amount of at least 5% by weight, desirably at least 10% by weight, based on the total weight of unsaturated group-containing urethane prepolymer (A) and unsaturated monomers which are to be blended at said stage.

In thus produced copolymer, emulsion particles form a multi-layer structure, in which at least one layer makes urethane graft copolyer layer. The above-mentioned multi-stage polymerization gives free choice of polymerization components according to purposes which are required of emulsion particles Besides, although urethane component is contained, it is possible to achieve high solid content of emulsion.

Compound (II)

The resin composition of the present invention contains compound (II) having, per molecule, two or more functional groups which may be the same or different, and which are selected from hydrazide group, semicarbazide group and hydrazone group as a cross-linking agent to react with carbonyl group which is contained in copolymer (I) and in carbonyl group-containing copolymer (III) which is added where necessary.

Examples of compound (II-1) having two or more hydrazide groups per molecule include dihydrazide of saturated aliphatic dicarboxylic acid having 2 to 18 carbon atoms such as oxalic acid dihydrazide, malonic acid dihydrazide, succinic acid dihydrazide, glutaric acid dihydrazide, adipic acid dihydrazide and sebacic acid dihydrazide; dihydrazide of monoolefinic unsaturated dicarboxylic acid such as maleic acid dihydrazide, fumaric acid dihydrazide and itaconic acid dihydrazide; dihydrazide of phthalic acid, terephthalic acid and isophthalic acid; dihydrazide, trihydrazide or tetrahydrazide of pyromellitic acid; nitrilotriacetic acid trihydrazide, citric acid trihydrazide and 1,2,4-benzenetrihydrazide; ethylenediaminetetraacetic acid tetrahydrazide; 1,4,5,8-naphthoic acid tetrahydrazide; and polyhydrazide obtained by reaction between a lower polymer having a lower alkyl carboxylic acid ester group and hydrazine or hydrazine hydrate (see Japanese Patent Publication No. 22878/1977).

If too much hydrophobic, the hydrazide compounds described above are hard to be water-dispersed, and may be incapable of giving an even cross-linked coating film. It is preferable therefore to use compounds having suitable hydrophilicity and a relatively low molecular weight. Preferable among the examples above are dihydrazides of saturated aliphatic dicarboxylic acids such as adipic acid dihydrazide and succinic acid dihydrazide.

Examples of compound (II-2) having two or more semicarbazide groups per molecule include carbonic acid dihydrazide and bissemicarbazide; multifunctional semicarbazides obtained by making diisocyanates such as hexamethylenediisocyanate and isophoronediisocyanate or polyisocyanate compounds derived therefrom react with N,N-substituted hydrazines such as N,N-dimethylhydrazine or the above-mentioned hydrazides in excess; water-based multifunctional semicarbazides obtained by making an excess amount of the above-mentioned dihydrazides react with isocyanate groups contained in a product obtained from reaction between the above polyisocyanate compounds and active hydrogen compounds having hydrophilic groups such as polyetherpolyols and polyethylene glycol monoalkyl ethers; and the mixtures of the above multifunctional semicarbazides and water-based multifunctional semicarbazides (for example, Japanese Patent Application Laid-Open No. 151358/1996, Japanese Patent Application Laid-Open No. 283377/1996 and Japanese Patent Application Laid-Open No. 245878/1996).

For example, bisacetyl dihydrazone can suitably be used as compound (II-3) having two or more hydrazone groups per molecule.

The above-mentioned compounds (II-1), (II-2) and (II-3) may be used either singly or in combination of two or more kinds thereof.

Curable Resin Composition

The curable resin composition of this invention comprises, as essential components, the above-mentioned copolymer (I) and compound (II) dissolved or dispersed in an aqueous medium.

The curable resin composition of this invention preferably further comprises carbonyl group-containing copolymer (III) with a view to increasing solid content in the whole of composition and to improve weatherability.

Carbonyl group-containing copolymer (III) is a copolymer which is obtained by copolymerizing a carbonyl group-containing ethylenically unsaturated monomer (h) with another ethylenically unsaturated monomer (i).

As carbonyl group-containing ethylenically unsaturated monomer (h), there can be employed the same ones as carbonyl group-containing ethylenically unsaturated monomer (f) which is used for the production of the above-mentioned copolymer (I).

As another ethylenically unsaturated monomer (i) to be copolymerized with carbonyl group-containing ethylenically unsaturated monomer (h), there can be employed the same ones as said another ethylenically unsaturated monomer (g) which is used for the production of the above-mentioned copolymer (I). In particular preferable from the viewpoint of copolymerizability, coating film physical properties and particle stability are styrene, alkyl (meth)acrylate having an alkyl group having 1 to 8 carbon atoms, hydroxyalkyl (meth)acrylate having an alkylene group having 2 to 4 carbon atoms, (meth)acrylic acid and (meth)acrylamide.

Copolymer (III) can readily be produced, for example, by copolymerizing the above-mentioned carbonyl group-containing ethylenically unsaturated monomer (h) with another ethylenically unsaturated monomer (i) in the presence of a surfactant as emulsifier according to a conventional emulsion polymerization method.

In the emulsion polymerization described above, carbonyl group-containing ethylenically unsaturated monomer (h) can be used usually in an amount of 0.5 to 50% by weight, preferably 5 to 30% by weight based on the total amount of monomers.

In this invention, copolymer (I) and carbonyl group-containing copolymer (III) may be used in such a proportion that the solid content weight ratio of copolymer (I)/carbonyl group-containing copolymer (III) falls within the range of 99/1 to 10/90, preferably 90/10 to 20/80.

When a copolymer which is obtained by multi-stage emulsion polymerization is used as copolymer (I), copolymer (I) and carbonyl group-containing copolymer (III) may be used in such a proportion that the solid content weight ratio of copolymer (I)/carbonyl group-containing copolymer (III) falls within the range of 100/0 to 15/85, preferably 100/0 to 20/80.

According to circumstances, the curable resin composition of the present invention may further contain an organosilicate compound or a modified organosilicate compound for the purpose of improvement in the stain resistance of coating film when the curable resin composition of the present invention is used as top coating paint for single-layer finishing or multi-layer finishing. Organosilicate compound which is used for such a purpose includes, for example, compounds of the following Formula (5):

(5)

wherein $R^8$ is the same or different, and represents a hydrogen atom or a monovalent hydrocarbon group having 1 to 10, preferably 1 to 4, carbon atoms.

Suited as the hydrocarbon group described above are, for example, alkyl groups such as methyl, ethyl, n-propyl, iso-propyl, n-butyl, iso-butyl, t-butyl, n-pentyl, iso-pentyl, n-hexyl, iso-hexyl and n-octyl and aryl groups such as phenyl.

Specific examples of the organosilicate compound represented by Formula (5) include tetrahydroxysilane, tetramethoxysilane, tetraethoxysilane, tetrapropoxysilane, tetrabutoxysilane, tetraphenoxysilane and dimethoxydiethoxysilane, which can be used either alone or in combination of two or more kinds thereof.

When the above-mentioned organosilicate compound is to be introduced into aqueous composition, it can be blended in the form of an emulsion which is prepared by forcibly aqueous-dispersing organosilicate compound together with an emulsifier by means of a homogenizer.

Branched or linear condensation products of the above-mentioned organosilicate compounds can also be used, in which case condensation degree falls suitably in a range of usually 2 to 100, particularly 5 to 50.

Furthermore, a modified organosilicate compound prepared by making an alkoxy group or a hydroxyl group contained in the organosilicate compound and/or a condensation product thereof described above react with a part (for example, 0.001 to 0.5 mole, particularly 0.05 to 0.2 mole of polyalkylene glycol-based compound per mole of the above alkoxy group or hydroxyl group) of a polyalkylene glycol-based compound can particularly suitably be used due to their good solubility in water.

Polyalkylene glycol-based compound as a modifying agent includes compounds of the following Formula (6):

(6)

wherein $R^9$ represents a hydrogen atom, an alkyl group or an aryl group; $R^{10}$ represents an alkylene group having 2 to 4 carbon atoms; and n is 2 to 60.

Concrete examples of the above-mentioned compounds include polyalkylene glycols such as polyethylene glycol, polypropylene glycol and polytetramethylene glycol; alkoxypolyalkylene glycols such as methoxypolyethylene glycol, ethoxypolyethylene glycol, ethoxypolypropylene glycol and ethoxypolybutylene glycol; and polyoxyalkylene alkylphenyl ethers such as polyoxyethylene nonylphenyl ether and polyoxyethylene octylphenyl ether. In particular, polyethylene glycol and polyoxyethylene nonylphenyl ether are suited.

The content of the organosilicate compound described above in the resin composition of the present invention can be allowed to fall in a range of usually 0.1 to 50 parts by weight, preferably 1 to 20 parts by weight, per 100 parts by weight of the resin solid content in the above resin composition.

The resin composition of the present invention may, under circumstances, contain a compound having two or more (meth)acryloyl groups such as alkylene glycol di(meth) acrylate, polyalkylene glycol poly(meth)acrylate, urethane (meth)acrylate and polyester (meth)acrylate, by which to promote photo-curing in the copolymer (I).

Furthermore, a color pigment, an extender pigment, a surfactant, a dispersant, a defoaming agent, a thickener, a film-forming aid, a preservative, an antifreezing agent and the like may be blended as circumstances may demand.

The resin curable composition of this invention can be produced by adding and blending compound (II) and other addtive to a dispersion of copolymer (I) and, under circumstances, copolymer (III) as well, in an aqueous medium.

The curable resin composition of this invention is readily cured at room temperature. The irradiation of natural light further promotes curing. Hence, the curable resin composition of this invention is suitable as a resin component in water-based paint for internal and external decoration of buildings and for the coating of bridges and ships.

Water-Based Coating Composition

When the resin composition of the present invention is used as paint, conventional paint additives can be blended. Examples of additives include fillers such as clay, talc and titan white; film-forming aids such as butyl cellosolve, butyl carbitol and dipropylene glycol monobutyl ether; plasticizers such as dibutyl phthalate and dioctyl phthalate; tackifiers such as rosin, terpenephenol and petroleum resins; various surfactants used for the purposes of humidifying, dispersing and defoaming; and thickeners, thixotropy agents and antifreezing agents.

Furthermore, when the curable resin composition of the present invention is used as a coloring paint, a pigment can be blended. Conventional paint pigment can be used as said pigment. Concrete examples include coloring pigments such as titanium oxide, carbon black and red iron oxide; extender pigments such as calcium carbonate, talc, mica, clay, diatomaceous earth, silicate and baryte; and aggregates, which can suitably be selected and used according to use of the coating composition of the present invention.

As for pigment content, pigment volume concentration (hereinafter abbreviated as "PVC") in said coating composition is preferably in a range of 10 to 70% so that the photocuring of the above-mentioned coating composition may not substantially be prevented, and that the coating composition may keep its hiding power suitable as enamel paint.

Here, the "pigment volume concentration (PVC)" is a volume proportion of pigment content to solid content in the mixture of resin and pigment in the above coating composition, which is calculated from the following equation:

$$PVC\ (\%) = \frac{\text{volume of pigment component}}{(\text{volume of pigment component}) + (\text{volume of resin solid content})} \times 100$$

When the coating composition of the present invention is used as a top coating paint, PVC is 10 to 60%, preferably 15 to 55%, while, when the coating composition of the present invention is used as an under coating paint, PVC is 30 to 70%, preferably 30 to 66%.

The water-based coating composition of the present invention is readily cured at a room temperature, and the curing thereof is further expedited by irradiation with natural light. Hence, the water-based coating composition of this invention is particularly suitable for internal and external decoration of buildings, and for the coating of bridges and ships. The coating composition of this invention gives a coating film having an excellent performance even with single layer finish, and, therefore, the coating composition of this invention can be used as a single-layer top coating paint. The coating composition of this invention can also be used as a top coating paint for multilayer finish, or as an under coating paint for substrate arrangement.

The coating composition of the present invention can be applied to substrate, a base-arranged face or a pre-coated face. Examples of said substrate include, without restriction, a concrete face, a mortar face, a slate board, a PC board, an ACL board, a cement calcium silicate board, a concrete block face, wood, stone, plastic and metal. Examples of the base-arranged face or pre-coated face include coating film faces of an acryl resin base, an acryl urethane resin base, a polyurethane resin base, a fluororesin base, a silicon acryl resin base, a vinyl acetate resin base and an epoxy resin base which are provided op these substrates.

The water-based coating composition of the present invention is applied usually in an amount of 0.3 to 1.5 kg/m$^2$, preferably 0.4 to 1.0 kg/m$^2$, when used for single layer finish; usually in an amount of 0.06 to 2.0 kg/m$^2$, preferably 0.8 to 1.6 kg/m$^2$, when used as a top coating paint; and usually in an amount of 0.3 to 2.0 kg/m$^2$, preferably 0.5 to 1.5 kg/m$^2$, when used as an under coating paint.

Application is conducted, for instance, by means of conventionally known applicators such as a roller, an air spray, an airless spray, a lithin gun, a universal gun and a brush.

The present invention is explained below in more detail, with reference to examples, wherein "part" means part by weight.

Production of Copolymer with Use of Unsaturated Group-Containing Urethane Prepolymer

PRODUCTION EXAMPLE 1

A 2-liter four-necked flask was charged with 860 parts of "Kyowanol D" (Note 1), 2,000 parts of polypropylene glycol (molecular weight: about 1,000), 740 parts of polycaprolactonediol (molecular weight: about 530) and 210 parts of 2,2'-dimethylolpropionic acid. Temperature was raised to 100° C., and, then, 1,110 parts of isophoronediisocyanate was added dropwise. After the dropwise addition was over, the resultant liquid was stirred at 100° C., and, one hour later when the concentration of isocyanate group reached 0.41 meq/g, 195 parts of 2-hydroxyethyl methacrylate and 37 parts of n-butyl alcohol were added. The resultant mixture was stirred at 100° C. for 2 hours, and was then cooled to 40° C., and, subsequently, 162 parts of triethylamine and 9,000 parts of deionized water were added, and, thus, there was obtained an aqueous dispersion of unsaturated group-containing urethane prepolymer (UP-1) which had a solid content of 30% by weight.

(Note 1) "Kyowanol D": texanol isobutyl ether, manufactured by Kyowa Hakko Kogyo Co., Ltd.

Then, another 2-liter four-necked flask was charged with 210 parts of deionized water and 6 parts of "Newcol 707SF" (Note 2). After the interior of flask was purged with nitrogen, the content of flask was heated to 70° C. Subsequently, a monomer emulsion of the following formulation, an aqueous solution of catalyst and an aqueous solution of reducing agent were introduced dropwise in the flask over a period of three hours.

(Note 2) "Newcol 707SF": anionic surfactant having a polyoxyethylene chain, manufactured by Nippon Nyukazai Co., Ltd.; non-volatile content: 30%

Formulation of Monomer Emulsion

| | |
|---|---|
| Aqueous dispersion of unsaturated group-containing urethane prepolymer (UP-1) | 333 parts |
| Deionized water | 600 parts |
| Diacetoneacrylamide | 40 parts |
| Imideacrylate (Note 3) | 50 parts |
| Styrene | 60 parts |
| Methylmethacrylate | 150 parts |
| n-Butylacrylate | 100 parts |
| Ammonium persulfate | 2 parts |

(Note 3)
Imideacrylate: Imideacrylate of the following Formula (7)

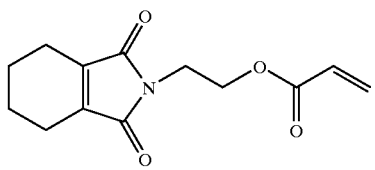

(7)

Formulation of Aqueous Solution of Catalyst

| | |
|---|---|
| t-Butylhydroperoxide | 1.5 parts |
| Deionized water | 30 parts |

Formulation of Aqueous Solution of Reducing Agent

| | |
|---|---|
| Sodium formaldehyde sulfoxylate | 1.5 parts |
| Deionized water | 30 parts |

After the dropwise introduction was over, the resultant liquid was maintained at a temperature of 70° C. for one hour, and was then cooled to give an aqueous solution of copolymer (U-1) which had a solid content of 30% by weight.

PRODUCTION EXAMPLE 2

An aqueous solution of copolymer (U-2) was obtained in the same manner as in Production Example 1 except that the formulation of monomer emulsion of Production Example 1 was replaced with the following.

Formulation of Monomer Emulsion

| | |
|---|---|
| Aqueous dispersion of unsaturated group-containing urethaneprepolymer (UP-1) | 333 parts |
| Deionized water | 600 parts |
| Diacetoneacrylamide | 40 parts |
| Styrene | 100 parts |
| Methylmethacrylate | 180 parts |
| n-Butylacrylate | 80 parts |
| Ammonium persulfate | 2 parts |

(Multi-Stage) Production of Copolymer with Use of Unsaturated Group-Containing Urethane Prepolymer

PRODUCTION EXAMPLE 3

A 4-liter four-necked flask was charged with 660 parts of "PLACCEL 205" (Note 4), III parts of dimethylol butanoic acid and 325 parts of "Kyowanol D" (Note 1), and the temperature was raised to 80° C. When the resultant mixture became uniform, 666 parts of isophoronediisocyanate was added dropwise over a period of 30 minutes. After the dropwise addition was over, the resultant liquid was maintained at 80° C., and, when isocyanate value became 65 or lower, 139 parts of 2-hydroxyethyl acrylate was added. The resultant mixture was kept at 80° C. When isocyanate value became 25 or lower, 212 parts of ethylene glycol was added. The resultant mixture was kept at 80° C. When isocyanate value became 5 or lower, the mixture was cooled, and, thus, there was obtained a solution of unsaturated group-containing urethane prepolymer (UP-2) which had a solid content of 77% by weight.

(Note 4) "PLACCEL 205": polycaprolactone diol, manufactured by Daicel Chemical Industries, Ltd.

Then, another 5-liter four-necked flask was charged with 348 parts of deionized water and 0.6 g of "Newcol 707SF" (Note 2). After the interior of flask was purged with nitrogen, the content of flask was heated to 85° C. While the liquid in the flask was maintained at a temperature of 85° C., 0.8 g of ammonium persulfate was added to the liquid immediately before the first-stage monomer emulsion of the following formulation was added dropwise. Said first-stage monomer emulsion was added dropwise over a period of three hours.

Formulation of First-Stage Monomer Emulsion

| | |
|---|---|
| Deionized water | 271 parts |
| Imideacrylate (Note 3) | 75 parts |
| Methylmethacrylate | 210 parts |
| Styrene | 100 parts |
| n-Butylacrylate | 180 parts |
| 2-Ethylhexylacrylate | 110 parts |
| Diacetoneacrylamide | 60 parts |
| Hydroxyethylacrylate | 15 parts |
| "Newcol 707SF" (Note 2) | 50 parts |
| Ammonium persulfate | 1.5 parts |

After the dropwise addition was over, the resultant liquid was ripened at 85° C. for 30 minutes, and was then cooled to 75° C. The liquid was further ripened for 30 minutes, and, then, while the liquid was maintained at 75° C., the second-stage monomer emulsion of the following formulation was added thereto dropwise over a period of two hours.

Formulation of Second-Stage Monomer Emulsion

| Solution of unsaturated group-containing urethane prepolymer (UP-2) | 130 parts |
|---|---|
| Imideacrylate (Note 3) | 25 parts |
| Methylmethacrylate | 50 parts |
| n-Butylacrylate | 55 parts |
| Diacetoneacrylamide | 20 parts |
| Triethylamine | 5.1 parts |
| Ammonium persulfate | 0.6 part |
| Deionized water | 373 parts |

After the dropwise addition was over, a solution which had been prepared by dissolving 0.5 part of ammonium persulfate in 40 parts of deionized water was added dropwise over a period of 30 minutes to the liquid in the flask. After the dropwise addition was over, the resultant liquid was maintained at a temperature of 75° C. for one hour, and, thus, there was obtained an emulsion-type aqueous dispersion of copolymer (U-3) which had a solid content of 47% by weight.

PRODUCTION EXAMPLE 4

An aqueous dispersion of copolymer (U-4) which had a solid content of 47% by weight was obtained in the same manner as in Production Example 3 except that the formulation of monomer emulsion to be added dropwise was replaced with the following.

Formulation of First-Stage Monomer Emulsion

| Deionized water | 271 parts |
|---|---|
| Methylmethacrylate | 250 parts |
| Styrene | 100 parts |
| n-Butylacrylate | 215 parts |
| 2-Ethylhexylacrylate | 110 parts |
| Hydroxyethylacrylate | 15 parts |
| Diacetoneacrylamide | 60 parts |
| "Newcol 707SF" (Note 2) | 50 parts |
| Ammonium persulfate | 1.5 parts |

Formulation of Second-Stage Monomer Emulsion

| Solution of unsaturated group-containing urethane prepolymer (UP-2) | 30 parts |
|---|---|
| Methylmethacrylate | 60 parts |
| n-Butylacrylate | 70 parts |
| Diacetoneacrylamide | 20 parts |
| Triethylamine | 5.1 parts |
| Ammonium persulfate | 0.6 part |
| Deionized water | 373 parts |

Production of Acrylic Copolymer Having Carbonyl Group

PRODUCTION EXAMPLE 5

A 2-liter four-necked flask was charged with 242 parts of deionized water and 2.4 parts of "Newcol 707SF" (Note 2). After the interior of flask was purged with nitrogen, the content of flask was heated to 80° C. Immediately before monomer emulsion of the following formulation was added dropwise, 0.7 part of ammonium persulfate was put into the flask. Said monomer emulsion was added dropwise over a period of three hours.

Formulation of Monomer Emulsion

| Deionized water | 352 parts |
|---|---|
| Diacetoneacrylamide | 33 parts |
| Acrylic acid | 3.3 parts |
| Styrene | 101 parts |
| Methylmethacrylate | 251 parts |
| 2-Ethylhexylacrylate | 104 parts |
| n-Butylacrylate | 179 parts |
| "Newcol 707SF" (Note 2) | 64.5 parts |
| Ammonium persulfate | 1.3 parts |

After the dropwise addition was over, a solution which had been prepared by dissolving 0.7 part of ammonium persulfate in 7 parts of deionized water was added dropwise over a period of 30 minutes to the liquid in the flask. The resultant liquid was matured at a temperature of 80° C. for two hours, and, thus, there was obtained a carbonyl group-containing acrylic copolymer which had a solid content of 51% by weight.

Production of Modified Organosilicate

PRODUCTION EXAMPLE 6

A reactor equipped with a stirrer, a thermometer, a refluxing tube, a nitrogen-introducing tube and a water separator was charged with 500 parts of "Ethyl Silicate 48" (Note 5), 324.5 parts of "Newcol 568" (Note 6) and 0.082 part of "Scat 24" (Note 7). The resultant mixture was heated to 120° C. with stirring in nitrogen atmosphere. Then, the temperature was raised, over a period of 4 hours, to 160° C., which was maintained for one hour. Evaporating ethanol etc. was distilled off in an amount of 25 parts by water separator, and, thus, there was obtained 800 parts of modified organosilicate.

(Note 5) "Ethyl Silicate 48": condensation product of ethyl silicate, manufactured by Tama Chemicals Co., Ltd.

(Note 6) "Newcol 568": polyoxyethylene nonylphenyl ether, manufactured by Nippon Nyukazai Co., Ltd.

(Note 7) "Scat 24": tin-based catalyst, manufactured by Sankyo Organic Chemicals Co., Ltd.

Production of Pigment-Dispersed Paste

PRODUCTION EXAMPLE 7

A vessel was charged in order with components shown below, with stirring by disper which was continued for 30 minutes until the resultant mixture was homogenized to give a pigment-dispersed paste.

Formulation of Pigment-Dispersed Paste

| Clean water | 8.0 parts |
|---|---|
| Ethylene glycol | 2.0 parts |
| "Slaoff 72N" (Note 8) | 0.1 part |
| "Nopcosand K" (Note 9) | 0.3 part |
| "Titan White JR-600A" (Note 10) | 24.6 parts |
| "SN Defoamer A-63" (Note 11) | 0.4 part |

(Note 8)
"Slaoff 72N": preservative, manufactured by Takeda Chemical Industrties, Ltd.
(Note 9)
"Nopcosand K": pigment dispersant, manufactured by San Nopco Ltd.
(Note 10)
"Titan White JR-600A": titan white, manufactured by Tayca Corporation
(Note 11)
"SN Defoamer A-63": defoamer, manufactured by San Nopco Ltd.

Preparation of Premix Coating Composition

PRODUCTION EXAMPLES 8 TO 15

Components shown in the following Table 1 were added in order to the above-mentioned pigment-dispersed paste, and, then, the resultant mixture was stirred by disper until homogenized to give premix coating compositions (T-1) to (T-8).

TABLE 1

|  | Production Example | | | | | | | |
|---|---|---|---|---|---|---|---|---|
|  | 8 | 9 | 10 | 11 | 12 | 13 | 14 | 15 |
| Premix coating composition | T-1 | T-2 | T-3 | T-4 | T-5 | T-6 | T-7 | T-8 |
| Pigment-dispersed paste | 35.4 | 35.4 | 35.4 | 35.4 | 35.4 | 35.4 | 35.4 | 35.4 |
| 30% Aqueous dispersion of copolymer (U-1) | 56.0 | 32.0 |  |  | 56.0 |  |  |  |
| 47% Aqueous dispersion of copolymer (U-3) |  |  | 51.1 | 35.7 |  |  |  |  |
| 30% Aqueous dispersion of copolymer (U-2) |  |  |  |  |  | 56.0 |  |  |
| 47% Aqueous dispersion of copolymer (U-4) |  |  |  |  |  |  | 51.1 |  |
| 51% Aqueous dispersion of acrylic copolymer | 14.1 | 28.2 |  | 14.1 | 14.1 | 14.1 |  | 47 |
| Texanol | 3 | 3 | 3 | 3 | 3 | 3 | 3 | 3 |
| Adekanol UH-438 (Note 12) | 0.8 | 0.8 | 0.8 | 0.8 | 0.8 | 0.8 | 0.8 | 0.8 |
| SN Defoamer A-63 (Note 11) | 0.4 | 0.4 | 0.4 | 0.4 | 0.4 | 0.4 | 0.4 | 0.4 |
| Modified organosilicate |  |  |  |  | 1.5 |  |  |  |
| PVC (%) (Note 13) | 20 | 20 | 20 | 20 | 20 | 20 | 20 | 20 |
| Solid content ratio of copolymer/acrylic copolymer | 70/30 | 40/60 | 100/0 | 70/30 | 70/30 |  |  |  |

(Note 12)
Adekanol UH-483: thickener, manufactured by Asahi Denka Kogyo K.K.
(Note 13)
PVC: Pigment Volume Concentration; proportion by volume of pigment in solid content in mixture of resin and pigment Preparation of Paint

EXAMPLES 1 TO 8 AND COMPARATIVE EXAMPLES 1 TO 4

Cross-linking agent was blended with 100 parts of each of premix paint which had been obtained in Production Examples 8 to 15, in such a combination as shown in the following Table 2, to give respective coating compositions.
Preparation of Test Boards for Coating "Multiconcrete Primer EPO" (epoxy-based primer, manufactured by Kansai Paint Co., Ltd.) was applied onto a slate board of 70×150×5 mm. On the following day, each paint shown in the following Table 2 was diluted to about 70 KU by clean water, and was then applied by brush so that the coating amount might be about 0.15 kg/m².

Each paint and each test board was evaluated according to criteria described later. Results are shown in Table 2.

TABLE 2

|  |  | Example | | | | | | | | Comparative Example | | | |
|---|---|---|---|---|---|---|---|---|---|---|---|---|---|
|  |  | 1 | 2 | 3 | 4 | 5 | 6 | 7 | 8 | 1 | 2 | 3 | 4 |
| Formulation | Premix paint (100 parts) | T-1 | T-1 | T-1 | T-2 | T-3 | T-4 | T-5 | T-2 | T-6 | T-7 | T-8 | T-1 |
|  | Adipic acid dihydrazide | 0.2 |  |  | 0.6 |  |  |  | 0.6 | 1.8 | 0.6 |  |  |
|  | SX-601 (Note 14) |  | 2 |  |  | 2 |  | 2 |  |  | 2 |  |  |
|  | 20% Bisacetyl dihydrazone (Note 15) |  |  | 1.2 |  |  | 1.2 |  |  |  |  | 1.2 |  |
| Number of functional group per mole of carbonyl group |  | 0.25 | 0.47 | 0.45 | 0.78 | 0.34 | 0.37 | 0.76 | 2.35 | 0.75 | 0.34 | 0.50 | 0.00 |
| Storage stability |  | ◉ | ◉ | ◉ | ◉ | ◉ | ◉ | ◉ | Δ | ◉ | ◉ | ◉ | ◉ |
| Water resistance in initial drying (outdoor) |  | ○ | ◉ | ◉ | ◉ | ◉ | ◉ | ◉ | ◉ | Δ | Δ | Δ | Δ |
| Water resistance in initial drying (indoor) |  | ○ | ○ | ○ | ◉ | ○ | ○ | ◉ | ◉ | ○ | ○ | ○ | X |
| Coating film stretch at low temperature |  | ○ | ○ | ○ | ○ | ○ | ○ | ○ | ○ | ○ | ○ | Δ | ○ |
| Outdoor dirt pick-up and resistance |  | ○ | ○ | ○ | ○ | ○ | ○ | ◉ | ○ | ○ | ○ | ○ | Δ |

(Note 14)
"SX-601": semicarbazide-based functional group-containing compound, manufactured by Asahi Chemical Industries Ltd.
Solid content: 45%; content of —NHCO—NHNH$_2$: 4.8 mmol/g resin
(Note 15)
20% Bisacetyl dihydrazone: methyl ethyl ketone solution Evaluation Test
Test of Storage Stability of Paint The top coating paint and the under coating paint which had been obtained in the above-mentioned manner were stored in a thermostatic chamber of 50° C. for one month, and, then, the state of paint was visually observed:

⊚: Almost unchanged from initial stage, and good;

○: A little increase in viscosity, but practically no problem;

Δ: Notable increase in viscosity, and not practically usable, but not gelatinized;

x: Gelatinized

Water Resistance Test in Initial Drying (Outdoor)

The respective test boards coated with the respective paint obtained in the above manner were put in a cool chamber of 5° C. for 30 minutes immediately after coating, and were then left to stand outdoors (in the shade on the northern side of a building) for about one hour in cloudy weather (under conditions of a temperature of 8 to 10° C. and an RH of 65 to 75%). Then, the respective test boards were dipped in water for 10 minutes, and the appearance of the coating films was visually observed:

⊚: No abnormalities on coating film

○: A little delustering and blistering, but practically no problem

Δ: Large or a lot of blisters, or partial dissolution of of coating film x: Marked dissolution of coating film Water Resistance Test in Initial Drying (Indoor)

The respective test boards coated with the respective paint obtained in the above manner were put in a cool chamber of 10° C. for 30 minutes from immediately after coating, and were then left to stand in a bright room which was not directly exposed to the sunlight but which admitted natural light, for about one hour (under conditions of a temperature of 20° C. and an RH of 60 to 70%). Then, the respective test boards were dipped in water for 10 minutes, and, thus, the appearance of the coating films was visually observed:

⊚: No abnormalities on coating film

○: A little delustering and blistering, but practically no problem

Δ: Large or a lot of blisters, or partial dissolution of of coating film x: Marked dissolution of coating film Elongation Percentage of Coating Film at Low Temperature The respective paint was applied on releasing paper by means of a 150 μm applicator, and dried for 28 days in a thermo-hygrostat of 20° C. and 65% RH. Then, the resultant coating film was peeled off the releasing paper to give a coating film piece having a film thickness of about 40 μm. The elongation percentage of this coating film piece was measured at a stretching speed of 20 mm/min under the condition of −10° C.:

○: 20% or more

Δ: from 5% to less than 20% x: less than 5%

Outdoor Exposure Test (Dirt Pick-Up Resistance)

A 90×300×5 mm slate board was coated with primer and respective paint by the same method as in the test board for paint described above, and, on the following day, was overcoated with respective paint similarly, and, then, was dried at a room temperature for 7 days to give two test coating boards for each paint, one for exposure test, and the other for control. The test coating board for exposure was mounted on an exposing board facing south with an angle of inclination of 30 degrees in Tokyo Office of Kansai Paint Co., Ltd. Three months later, the boards were taken out, and measured for a color difference ΔE in comparison with control. The smaller value is the better:

⊚: ΔE is less than 3

○: ΔE is from 3 to less than 5

Δ: ΔE is from 5 to less than 7 x: ΔE is 7 or more

As stated above, the curable resin composition of this invention is readily cured at room temperature by a reaction between carbonyl group and crosslinking agent which are contained in copolymer having urethane function. Even under an application-drying condition where moisture evaporation is slow (e.g., cloudy weather, low temperature or indoor), photocuring caused by maleimide group proceeds so long as light such as ultraviolet ray reaches. Hence, it is possible to improve coating film properties such as water resistance and stain resistance at the initial stage after paint application while keeping both the softness and low temperature physical properties of urethane and the weather resistance of acryl.

What is claimed is:

1. A curable resin composition which characteristically comprises both copolymer (I) which is produced by the copolymerization of unsaturated group-containing urethane prepolymer (A) which is obtained from a reaction of diisocyanate compound (a), glycol compound (b), carboxyl group-containing glycol compound (c) and hydroxyl group-containing ethylenically unsaturated monomer (d), with maleimide group-containing ethylenically unsaturated monomer (e), carbonyl group-containing ethylenically unsaturated monomer (f) and another ethylenically unsaturated monomer (g), and compound (II) which has, per molecule, two or more same or different functional groups selected from hydrazide group, semicarbazide group and hydrazone group.

2. The curable resin composition of claim 1 wherein diisocyanate compound (a) is selected from the group consisting of tetramethylenediisocyanate, 2,2,4-trimethylhexanediisocyanate, hexamethylenediisocyanate, lysinediisocyanate, 1,4-cyclohexylenediisocyanate, 4,4'-dicyclohexylmethanediisocyanate and isophoronediisocyanate.

3. The curable resin composition of claim 1 wherein glycol compound (b) is selected from the group consisting of low molecular weight glycols, high molecular weight glycols, polyesterpolyols and polycarbonatepolyols.

4. The curable resin composition of claim 1 wherein carboxyl group-containing glycol compound (c) is selected from the group consisting of 2,2-dimethylolpropionic acid, 2,2-dimethylolbutyric acid, 2,2-dimethylolvaleric acid and polyester-polyols or polyetherpolyols obtained by the condensation thereof.

5. The curable resin composition of claim 1 wherein hydroxyl group-containing ethylenically unsaturated monomer (d) is selected from the group consisting of hydroxyethyl (meth)acrylate, hydroxypropyl (meth)acrylate, hydroxybutyl (meth)acrylate, polyethylene glycol mono (meth)acrylate, polyethylene glycol di(meth)acrylate, polypropylene glycol mono(meth)acrylate, ε-caprolactone polyaddition product of hydroxyethyl (meth)acrylate, β-methyl-δ-valerolactone polyaddition product of hydroxyethyl (meth)acrylate, glycerol mono(meth)acrylate and glycerol di(meth)acrylate, allyl alcohol, glycerol monoallyl ether and glycerol diallyl ether, and alkylene oxide adducts thereof having 2 to 4 carbon atoms.

6. The curable resin composition of claim 1 wherein components (a), (b), (c) and (d) are made to react in such a proportion that the equivalent ratio of isocyanate groups to hydroxyl groups contained in these components falls in a range of 1:1 to 1:1.5.

7. The curable resin composition of claim 6 wherein 0.01 to 1 equivalent of hydroxyl group-containing ethylenically unsaturated monomer (d) is made to react per equivalent of isocyanate group.

8. The curable resin composition of claim 1 wherein unsaturated group-containing urethane prepolymer (A) has an acid value in a range of 10 to 200 mg KOH/gram of resin solid content.

9. The curable resin composition of claim 1 wherein maleimide group-containing ethylenically unsaturated monomer (e) are compounds having an ethylenically unsaturated group and a cyclic imide group of the following Formula (1):

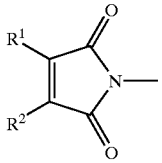

(1)

wherein $R^1$ and $R^2$, taken independently, represent a hydrogen atom or an alkyl group, or, taken together, represent a group forming a carbon ring along with carbon atoms to which $R^1$ and $R^2$ are bonded.

10. The curable resin composition of claim 9 wherein the compound having a cyclic imide group is imide (meth) acrylate of the following Formula (2):

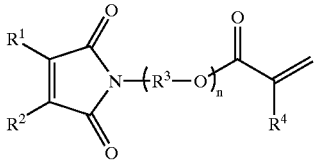

(2)

wherein $R^1$ and $R^2$ mean the same as defined in claim 9; $R^3$ represents an alkylene group; $R^4$ represents a hydrogen atom or a methyl group; and n is an integer of 1 to 6.

11. The curable resin composition of claim 10 wherein imide (meth)acrylate are compounds of the following Formulas (3) and (4):

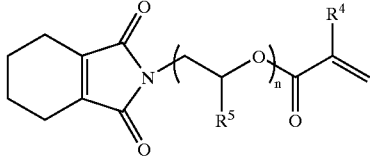

(3)

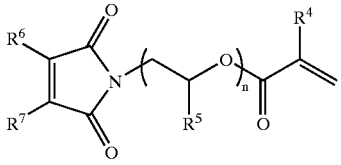

(4)

wherein $R^4$ and $R^5$ represent independently a hydrogen atom or a methyl group; $R^6$ and $R^7$ represent independently an alkyl group having 4 or less carbon atoms; and n is an integer of 1 to 6.

12. The curable resin composition of claim 1 wherein carbonyl group-containing ethylenically unsaturated monomer (f) is a monomer which has, in a molecule, at least one carbonyl group selected from aldehyde group and keto group, and a polymerizable double bond.

13. The curable resin composition of claim 1 wherein carbonyl group-containing ethylenically unsaturated monomer (f) is selected from the group consisting of (meth) acrolein, formylstyrol, vinyl alkyl ketone having 4 to 7 carbon atoms, acetoacetoxyethyl (meth)acrylate and diacetone(meth)acrylamide.

14. The curable resin composition of claim 13 wherein carbonyl group-containing ethylenically unsaturated monomer (f) is diacetone (meth)acrylamide.

15. The curable resin composition of claim 1 wherein another ethylenically unsaturated monomer (g) is selected from the group consisting of styrene, alkyl (meth)acrylate having an alkyl group having 1 to 8 carbon atoms, (meth) acrylic acid, hydroxyalkyl (meth)acrylate having an alkylene group having 2 to 4 carbon atoms and acrylamide.

16. The curable resin composition of claim 1 wherein unsaturated group-containing urethane prepolymer (A), maleimide group-containing ethylenically unsaturated monomer (e), carbonyl group-containing ethylenically unsaturated monomer (f) and another ethylenically unsaturated monomer (g) are made to react in such a proportion that the amount of unsaturated group-containing urethane prepolymer (A) as in a range of 2 to 40% by weight; the amount of maleimide group ethylenically unsaturated monomer (e) is in a range of 1 to 30% by weight; carbonyl group-containing ethylenically unsaturated monomer (I) is in a range of 1 to 30% by weight; and the amount of another ethylenically unsaturated monomer (g) is in a range of 0 to 96% by weight, each based on the total amount of the components (A), (e), (f) and (g).

17. The curable resin composition of claim 1 wherein copolymer (I) is produced by multi-stage emulsion polymerization of unsaturated group-containing urethane prepolymer (A) with maleimide group-containing ethylenically unsaturated monomer (e), carbonyl group-containing ethylenically unsaturated monomer (k) and another ethylenically unsaturated monomer (g) in the presence of water and emulsifying agent.

18. The curable resin composition of claim 1 wherein compound (II) is selected from the group consisting of oxalic acid dihydrazide, malonic acid dihydrazide, succinic acid dihydrazide, glutaric acid dihydrazide, adipic acid dihydrazide and sebacic acid dihydrazide, maleic acid dihydrazide, fumaric acid dihydrazide and itaconic acid dihydrazide, dihydrazide of phthalic acid, of terephthalic acid and isophthalic acid; dihydrazide, trihydrazide or tetrahydrazide of pyromellitic acid; nitrilotriacetic acid trihydrazide, citric acid trihydrazide, 1,2,4-benzenetrihydrazide, ethylenediaminetetraacetic acid tetrahydrazide, 1,4,5,8-naphthoic acid tetrahydrazide; polyhydrazide obtained by a reaction between a carboxylic acid lower alkyl ester group-containing low polymer and a hydrazine or a hydrazine hydrate, dihydrazide carbonate, bissemicarbazide; multifunctional semicarbazides obtained by a reaction between diisocyanate or polyisocyanate compound derived therefrom and an excess amount of N,N-substituted hydrazine such as N,N-dimethylhydrazine or the above-mentioned hydrazide; water-based multifunctional semicarbazide obtained by making dihydrazide react in excess with isocyanate group in a product obtained from a reaction between said polyisocyanate compound and a hydrophilic group-containing active hydrogen compound such as polyetherpolyols and polyethylene glycol monoalkyl ethers; a mixture of said multifunctional semicarbazide and water-based multifunctional semicarbazide, and bisacetyl dihydrazone.

19. The curable resin composition of claim 1 wherein compound (II) is dihydrazide of saturated aliphatic dicarboxylic acid having 2 to 18 carbon atoms.

20. The curable resin composition of claim 1 which further comprises carbonyl group-containing copolymer (III).

21. The curably resin composition of claim 20 wherein carbonyl group-containing copolymer (III) is obtained by the copolymerization of carbonyl group-containing ethylenically unsaturated monomer (h) with another ethylenically unsaturated monomer (i).

22. The curable resin composition of claim 21 wherein carbonyl group-containing ethylenically unsaturated monomer (h) is a monomer which has, in a molecule, at least one carbonyl group selected from aldehyde group and keto group, and a polymerizable double bond.

23. The curable resin composition of claim 21 wherein carbonyl group-containing ethylenically unsaturated monomer (h) is selected from the group consisting of(meth) acrolein, formylstyrol, vinyl alkyl ketone having 4 to 7 carbon atoms, acetoacetoxyethyl (meth)acrylate and diacetone(meth)acrylamides.

24. The curable resin composition of claim 21 wherein said another ethylenically unsaturated monomer (i) is selected from the group consisting of styrene, alkyl (meth) acrylate having an alkyl group having 1 to 8 carbon atoms, hydroxyalkyl (meth)acrylate having an alkylene group having 2 to 4 carbon atoms, (meth)acrylic acid and (meth) acrylamide.

25. The curable resin composition of claim 21 wherein carbonyl group-containing ethylenically unsaturated monomer (h) is used in an amount of 0.5 to 50% by weight based on the total amount of monomers.

26. The curable resin composition of claim 20 which contains copolymer (I) and carbonyl group-containing copolymer (III) in such a proportion that the solid content weight ratio of copolymer (I)/carbonyl group-containing copolymer (III) is within the range of 99/1 to 10/90.

27. The curable resin composition of claim 20 which contains copolymer (I) and carbonyl group-containing copolymer (III) in such a proportion that the solid content weight ratio of copolymer (I)/carbonyl group-containing copolymer (III) is within the range of 100/0 to 15/85, said copolymer (I) being produced by multi-stage emulsion polymerization of unsaturated group-containing urethane prepolymer (A) with maleimide group-containing ethylenically unsaturated monomer (e), carbonyl group-containing ethylenically unsaturated monomer (f) and another ethylenically unsaturated monomer (g) in the presence of water and emulsifying agent.

28. The curable resin composition of claim 1 which further contains organosilicate compound and/or its condensation product; or a modified organosilicate compound which is prepared by a reaction between organosilicate compound and/or its condensation product and 0.001 to 0.5 mole of polyalkylene glycol-based compound per mole of alkoxy group or hydroxyl group of said organosilicate compound and/or its condensation product.

29. The curable resin composition of claim 28 wherein organosilicate compound are compounds of the following Formula (5):

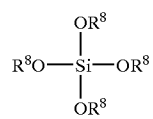
(5)

wherein R8 are the same or different, and represent a hydrogen atom or a monovalent hydrocarbon group having 1 to 10 carbon atoms.

30. The curable resin composition of claim 28 wherein polyalkylene glycol-based compound as a modifying agent are compounds of the following Formula (6):

$R^9O—(R^{10}O)n-H$ (6).

31. The curable resin composition of claim 28 which contains an organosilicate compound and/or its condensation product or a modified organosilicate compound in an amount of 0.1 to 50 parts by weight per 100 parts by weight of resin solid content in the resin composition.

32. A water-based coating composition which contains the curable resin composition of claim 1.

33. An article which has been coated with the water-based coating composition of claim 32.

* * * * *